(12) United States Patent
Saraswat

(10) Patent No.: US 9,874,453 B2
(45) Date of Patent: Jan. 23, 2018

(54) NAVIGATION SYSTEM HAVING POINT OF INTEREST RECOMMENDATION MECHANISM AND METHOD OF OPERATION THEREOF

(71) Applicant: Meenakshi Saraswat, San Francisco, CA (US)

(72) Inventor: Meenakshi Saraswat, San Francisco, CA (US)

(73) Assignee: Telenav, Inc., Santa Clara, CA (US)

( * ) Notice: Subject to any disclaimer, the term of this patent is extended or adjusted under 35 U.S.C. 154(b) by 246 days.

(21) Appl. No.: 13/631,639

(22) Filed: Sep. 28, 2012

(65) Prior Publication Data

US 2014/0095063 A1    Apr. 3, 2014

(51) Int. Cl.
*G01C 21/30* (2006.01)
*G01C 21/34* (2006.01)
*G06Q 30/02* (2012.01)
*G06Q 10/04* (2012.01)
*G06Q 30/06* (2012.01)

(52) U.S. Cl.
CPC ....... *G01C 21/3484* (2013.01); *G06Q 10/047* (2013.01); *G06Q 30/0224* (2013.01); *G06Q 30/0255* (2013.01); *G06Q 30/0261* (2013.01); *G06Q 30/0631* (2013.01)

(58) Field of Classification Search
CPC .... G01C 21/00; G01C 21/34; G01C 21/3626; H04M 1/67; G06F 3/0484; G06F 3/0488; G06Q 10/047; G06Q 10/08; G06Q 30/0257; G06Q 30/02

USPC ............... 701/400, 410; 455/414.3; 705/14.1
See application file for complete search history.

(56) References Cited

U.S. PATENT DOCUMENTS

| | | | | |
|---|---|---|---|---|
| 5,521,631 A * | 5/1996 | Budow | ................... | H04N 7/162 348/E7.06 |
| 5,568,030 A * | 10/1996 | Nishikawa | ........... | G05D 1/0255 301/1 |
| 6,370,513 B1 * | 4/2002 | Kolawa | ................... | G06Q 30/02 705/15 |
| 8,666,376 B2 * | 3/2014 | Ramer | ................... | G06Q 30/02 455/414.3 |
| 2006/0287810 A1 * | 12/2006 | Sadri | ....................... | G01C 21/20 701/438 |
| 2008/0214166 A1 * | 9/2008 | Ramer | ............... | G06Q 30/0257 455/414.3 |
| 2010/0030569 A1 * | 2/2010 | Okano | ................... | G06Q 30/08 705/347 |
| 2011/0040756 A1 * | 2/2011 | Jones | ................ | G06F 17/30864 707/737 |
| 2012/0100866 A1 * | 4/2012 | Grossman et al. | ........ | 455/456.1 |
| 2012/0185419 A1 * | 7/2012 | Kuhn | ................ | H04M 1/72569 706/12 |
| 2012/0254099 A1 * | 10/2012 | Flinn et al. | ..................... | 706/52 |
| 2013/0066819 A1 * | 3/2013 | Nice | ................ | G06F 17/30029 706/14 |

(Continued)

*Primary Examiner* — Shardul Patel
(74) *Attorney, Agent, or Firm* — IP Investment Law Group

(57) ABSTRACT

A method of operation of a navigation system includes: monitoring a purchase history; extrapolating a selection behavior associated with the purchase history; extrapolating a group behavior for a member designation associated with the selection behavior; generating a recommendation based on the group behavior; and generating a notification with the recommendation for displaying on a device.

20 Claims, 6 Drawing Sheets

(56) References Cited

U.S. PATENT DOCUMENTS

| | | | |
|---|---|---|---|
| 2013/0103306 A1* | 4/2013 | Uetake | G01C 21/3605 701/425 |
| 2013/0215116 A1* | 8/2013 | Siddique | G06Q 30/0643 345/420 |
| 2014/0365456 A1* | 12/2014 | Lee | 707/706 |

* cited by examiner

NAVIGATION SYSTEM HAVING POINT OF INTEREST RECOMMENDATION MECHANISM AND METHOD OF OPERATION THEREOF

TECHNICAL FIELD

The present invention relates generally to a navigation system and more particularly to a system having point of interest recommendation mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Numerous technologies have been developed to utilize this new functionality.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone or a personal digital assistant (PDA).

Location based services allow users to create, transfer, store, and/or consume information that affects the "real world". One such use of location-based services is to provide increased convenience and productivity features for a person's everyday activities.

Navigation systems and location based services enabled systems have been incorporated in automobiles, notebooks, handheld devices, and other portable products. Today, these systems aid users by incorporating available, real-time relevant information, such as maps, directions, entertainment, local businesses, or other points of interest (POI). The real-time information provides invaluable relevant information, when available or in service areas.

In response to consumer demand, navigation systems are providing ever-increasing functionality. Current navigations systems lack features that enable people to organize and plan events and meetings. The lack of these features reduces mobility and productivity when people are traveling.

Thus, a need still remains for a navigation system having point of interest recommendation mechanism providing low cost, improved functionality, and improved reliability. In view of the ever-increasing need to save costs and improve efficiencies, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: monitoring a purchase history; extrapolating a selection behavior associated with the purchase history; extrapolating a group behavior for a member designation associated with the selection behavior; generating a recommendation based on the group behavior; and generating a notification with the recommendation for displaying on a device.

The present invention provides a navigation system including: a monitor module for monitoring a purchase history; a behavior module, coupled to the monitor module, for extrapolating a selection behavior associated with the purchase history; an option module, coupled to the behavior module, for extrapolating a group behavior for a member designation associated with the selection behavior; a recommendation module, coupled to the option module, for generating a recommendation based on the group behavior; and a notification module, coupled to the recommendation module, for generating a notification with the recommendation for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
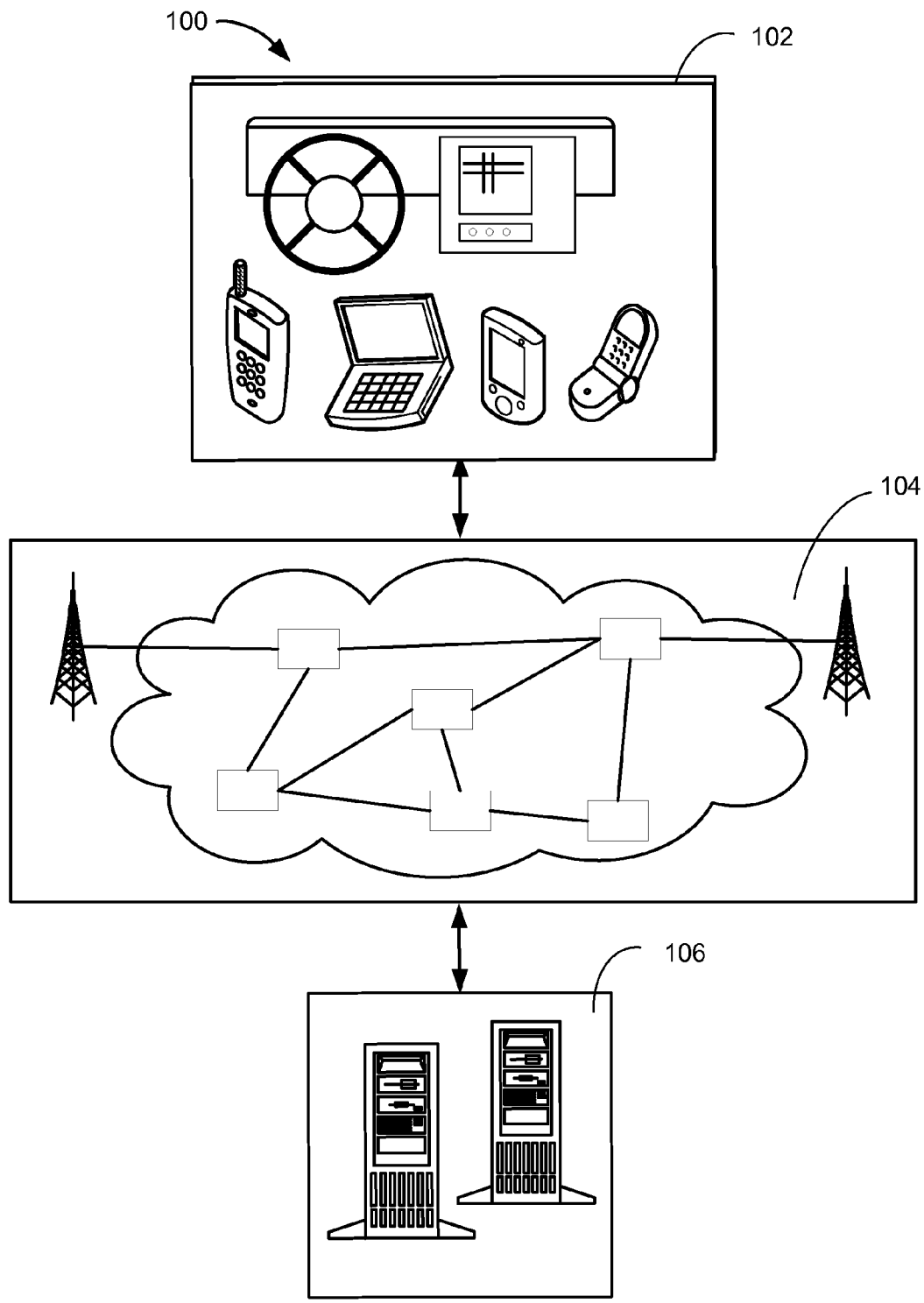
FIG. 1 is a navigation system having point of interest recommendation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "participant" referred to herein can include a user, owner, or person that is interacting with the navigation system of the present invention. For example, two people can use and interact with the present invention although one of the users can be the owner of the navigation system. A group of people using or interacting with the present invention can herein be referred to as "participants".

Referring now to FIG. 1, therein is shown a navigation system 100 having point of interest recommendation mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, a head unit, automotive telematic navigation system, or other multi-functional mobile communication or entertainment device. The head unit is defined as a component of a stereo system in a vehicle, home cinema system, or a combination thereof that provides a hardware interface for components of an electronic media system. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, a head unit, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
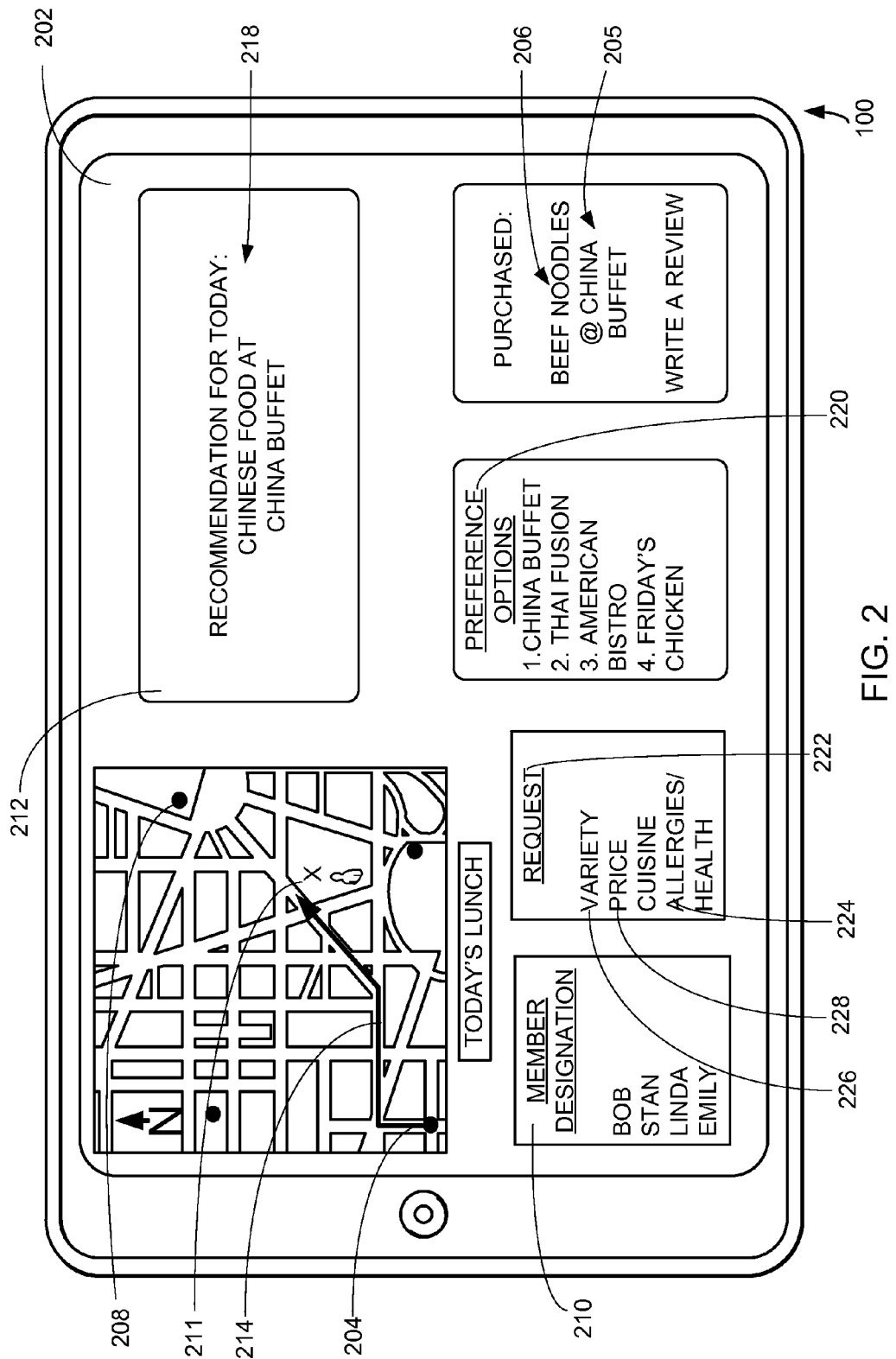
FIG. 2 is a first example of a display interface of the first device.

Referring now to FIG. 2, therein is shown a first example of a display interface 202 of the first device 102 of FIG. 1. The display interface 202 can depict examples of features and functions of the present invention and depicts electronic representations of physical objects such as roads and stores.

A current location 204 is defined as a present geographical location of the first device 102. The current location 204 can be determined by using GPS or cellular triangulation functions communicating through the first device 102. The current location 204 can be used as a reference point for generating navigation instructions for the first device 102.

A point of interest 205 is defined as an object or location relevant to a participant. The point of interest 205 can include a location of an activity, a restaurant, a meal, a purchase item, a movie, a store, an event, a purchase item, a service, a store location, a social engagement, or a business meeting location as examples. The navigation system 100 can be used to search for the point of interest 205 as an event, meal, or activity for a group of people.

A purchase history 206 is defined as a record of products and services purchased by the participant. The purchase history 206 can include the geographic location of the purchases. Products and services stored in the purchase history 206 can be purchased or received at the point of interest 205 as the geographic location.

For example, the navigation system 100 can identify goods and services purchased at the point of interest 205 by a participant and also identify the geographic location associated with the purchase. The purchase history 206 can include specific restaurants, food items, movie tickets, books, Digital Video Disks (DVDs), drinks purchased at establishments, movie theaters, and kiosks as examples. The purchase history 206 will be explained in further detail below.

An event destination 208 is defined as a geographic location of the point of interest 205. The event destination 208 can include the geographic location of a landmark, cross street, or building. The event destination 208 can be the street address for a building, a meeting, a social engagement, a business meeting, a date, an appointment, or a combination thereof as examples.

A member designation 210 is defined as an identifier of a collection or grouping of participants that are attending the same activity or event. The participants in the member designation 210 can be invited and can accept invitations for the event. The participants can also indicate availability for any upcoming events and automatically join the member designation 210 of the event. For example, a participant can indicate that they are available for lunch and automatically be placed into the member designation 210 if the participant is invited to a newly created lunch event.

A proximate destination 211 is defined as a geographical location for the point of interest 205 closest to the current location 204. The proximate destination 211 can also be a centralized geographical location for each participant in the member designation 210 using the navigation system 100. For example, the point of interest 205 can be a franchised fast food restaurant with many locations in a city. A group of participants can be scattered throughout a city but have decided to meet at the franchised fast food restaurant. The proximate destination 211 can be the geographic location of one of the restaurants in the franchise that is centrally located for each of the participants.

A notification 212 is defined as a message communicated to a participant of the navigation system 100. The format of the notification 212 can be visual, audio, or a combination thereof. The notification 212 can be conveyed to the participant for communicating navigation information and messages. The notification 212 can be a message in text, a symbol on the display interface 202, or an audio alert.

For example, the notification 212 in text format can be displayed on the display interface 202 or another external display. The notification 212 can also be an audio announcement. For example, the notification 212 can be communicated to the participant using text-to-speech.

A route 214 is defined as a course or navigation instruction from one geographic location to another geographic location. For example, the route 214 can be from the current location 204 to the proximate destination 211.

A recommendation 218 is defined as a suggestion made by the navigation system 100 for the participant or the member designation 210. The recommendation 218 can include suggestions for the point of interest 205 including restaurants, food items, movies, digital video disks (DVDs), desserts, and food trucks as examples. The recommendation 218 can also include a geographic location of where to purchase products and services suggested by the navigation system 100. The recommendation 218 can be generated based on both the preferences of an individual participant and the preferences of participants in the member designation 210.

For example, the participants in the member designation 210 can use the navigation system 100 to select a movie to rent for a movie night. The navigation system 100 can generate the recommendation 218 for the movie based on the preferences and movie viewing history of the participants in the group. The navigation system 100 can also suggest a geographic location to pick up the rental movie. The recommendation 218 will be explained in further detail below.

A preference option 220 is defined as a possible suggestion from the navigation system 100 based on the behavior of participants in the member designation 210. The navigation system 100 can extrapolate a plurality of the preference option 220 having a strong correlation to the preferences, likes, requests, and behavior of the participants in the member designation 210. The navigation system 100 can select one of the preference option 220 for the recommendation 218 that is presented to the participants in the member designation 210. Participants can also view and select from the plurality of the preference option 220 if the participants want to choose an alternative to the recommendation 218.

A preference request 222 is defined as a request made by a participant to influence the recommendation 218 generated by the navigation system 100. The preference request 222 can be a food cuisine, a genre of movie, or a specific request made for the event. For example, a participant can desire German food for the next meal and send the preference request 222 for German food. The recommendation 218 and the preference option 220 can be influenced by the preference request 222 to favor German food over other choices and options.

A health condition 224 is defined as a physical or medical characteristic of a participant that influences a participant's selections. For example, the health condition 224 can be a medical condition that prevents participation or consumption of an activity or food. The health condition 224 can include food and other substance allergies. The health condition 224 differs from preferences because the health condition 224 is a medical necessity or physical impairment.

For example, participants can indicate food allergies as the health condition 224 such as peanut allergies. The navigation system 100 can filter out the preference option 220 that is associated with peanut allergies such as restaurants that serve peanuts. Based on the health condition 224, the preference option 220 associated with peanut allergies will be given a low priority and will not be selected as the recommendation 218.

Further, for example, the health condition 224 can also include an injury such as a broken foot. If the participants in the member designation 210 are deciding between golf and watching a movie, the health condition 224 of a broken foot will cause the navigation system 100 to rank golf low when presenting the preference option 220 to participants.

A variety preference 226 is defined as a preference or inclination for variety in making selections. The variety preference 226 can be a trend or behavior that can be identified in the purchase history 206 of a participant. The navigation system 100 can analyze the purchase history 206 including the participant's food, menu, store item, and movie selections, and selection history to identify the variety preference 226.

Participants can also indicate the variety preference 226 in the preference request 222 to influence the preference option 220 of an event. For example, if the event is a restaurant for lunch, the navigation system 100 can receive from the participant the variety preference 226 in the preference request 222 and rank frequently attended restaurants lower when extrapolating the preference option 220. If a participant went to a Thai restaurant yesterday, the navigation system 100 can rank Thai restaurants low for the preference option 220 if the variety preference 226 is received. The variety preference 226 will be explained in further detail below.

A discount preference 228 is defined as the preference or inclination for sales or reduced price items. The discount preference 228 can be a trend or behavior that can be identified in the purchase history 206 of a participant. The navigation system 100 can analyze the purchase history 206 including the participant's food, menu, store items, and movie selections to identify the discount preference 228.

Participants can also indicate the discount preference 228 in the preference request 222 to influence the preference option 220 of an event. For example, the navigation system 100 can receive from the participant the discount preference 228 in the preference request 222 and rank locations, restaurants, and sale items that offer a discount higher when extrapolating the preference option 220. The preference option 220 or the point of interest 205 that does not include discounts or low prices can be filtered out or given a low priority when presented to the participants.

Figure 3:
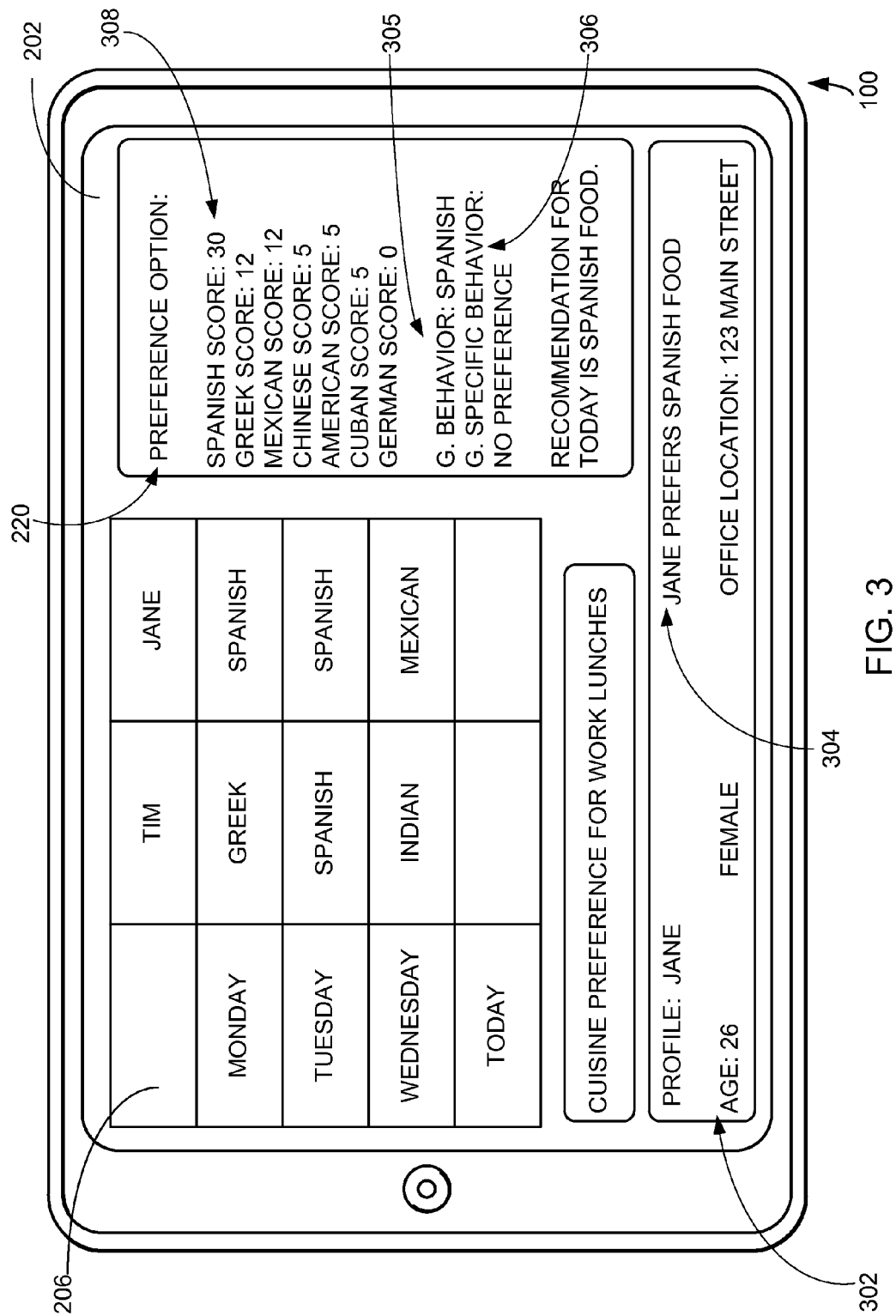
FIG. 3 is a second example of the display interface of the first device.

Referring now to FIG. 3, therein is shown a second example of the display interface 202 of the first device 102 of FIG. 1. The display interface 202 depicts a grouping of the preference option 220 and a chart of the purchase history 206 with cuisine types for a lunch event.

A user's demographic 302 is defined as a characteristic relating to a population including age, sex, gender, and class. The navigation system 100 can use data mining to identify factors of the user's demographic 302 or receive the user's demographic 302 through manual input. The navigation system 100 can use the user's demographic 302 for generating the recommendation 218 of FIG. 2 and for extrapolating the preference option 220.

For example, if a group of female participants in the member designation 210 of FIG. 2 wants to meet at a clothing store, the navigation system 100 can generate the recommendation 218 for a woman's clothing store based on the user's demographic 302 of the member designation 210. Further, for example, if the member designation 210 has only male participants, the navigation system 100 can make the recommendation 218 to a restaurant that is popular with males.

A selection behavior 304 is defined as identified patterns, trends, preferences, and dislikes associated with a participant. The selection behavior 304 can be determined by data mining and data analysis of the purchase history 206 including purchase locations, attended events, activities, and travel.

For example, the navigation system 100 can track the types of cuisine that a group of participants had for lunch during a week in the purchase history 206. Cuisine types can be tracked by monitoring the food item selected and identifying the type and location of the restaurant. The navigation system 100 can identify that Jane frequently has Spanish food for lunch every week as an example. From the lunch history for the week, the selection behavior 304 for Jane can be extrapolated as a preference for Spanish food.

Further, for example, the navigation system 100 can extrapolate that a participant prefers beef if the participant frequently orders beef other selections. The navigation system 100 can also identify if a participant has a preference for variety when ordering from a restaurant, if the participant has a pattern of ordering different items off the menu.

A group behavior 305 is defined as identified patterns, trends, preferences, and dislikes associated with the current participants in the member designation 210. The group behavior 305 can be extrapolated by analyzing the selection behavior 304 of each of the participants in the member designation 210. The group behavior 305 can be limited to only the participants in the member designation 210 and can exclude the purchase history 206 of people outside the member designation 210.

A group specific behavior 306 is defined as patterns, trends, preferences, and dislikes for an individual participant that are unique for a specific member designation but contrary to the individual's normal behavior. For example, Jane is not vegetarian but frequency is included in the member designation 210 with two other vegetarians for lunch. Jane will always choose a vegetarian food item out of respect for the other vegetarians in the member designation 210 although Jane never purchases vegetarian food when she is outside of the vegetarian group. Jane's vegetarian behavior with the specific vegetarian group is the group specific behavior 306 for Jane in the vegetarian group.

The navigation system 100 can extrapolate the group specific behavior 306 for Jane based on information from the purchase history 206 and the composition of the member designation 210 at the time of the purchase. The group specific behavior 306 can include food selections, location preferences, and other selections that are unique to specific compositions of the member designation 210.

Further, for example, Bob prefers rated R movies. However, if the member designation 210 includes young children, Bob will always select a cartoon movie. The navigation system 100 can extrapolate the group specific behavior 306 for Bob based on information from the purchase history 206 and the composition of the member designation 210 at the time of the purchase. The navigation system 100 can generate the recommendation 218 of FIG. 2 for an appropriate cartoon based on the group specific behavior 306 of Bob when in a specific member designation with young children.

A weight 308, such as a numeric value, can be assigned to each of the preference option 220 for determining how the plurality of the preference option 220 is presented to participants. For example, Spanish cuisine can be assigned a large numeric value for the weight 308 and all preference options associated with Spanish cuisine can be displayed first to participants. The weight 308 can be assigned based on the preferences of participants including the selection behavior 304, the group behavior 305, the group specific behavior 306, the user's demographic 302, and the preference request 222.

The navigation system 100 can add or subtract the weight 308 to entries of the preference option 220 based on the selection behavior 304, the group behavior 305, the group specific behavior 306, the user's demographic 302, and the preference request 222. For example, the preference option 220 that matches the group behavior 305 can have two points added to the weight 308 and points subtracted if the preference option 220 does not match the group behavior 305. The preference option 220 that matches the preference request 222 can have four points added to the weight 308. The preference option 220 with the largest numerical value for the weight 308 can be selected when the recommendation 218 is generated.

Figure 4:
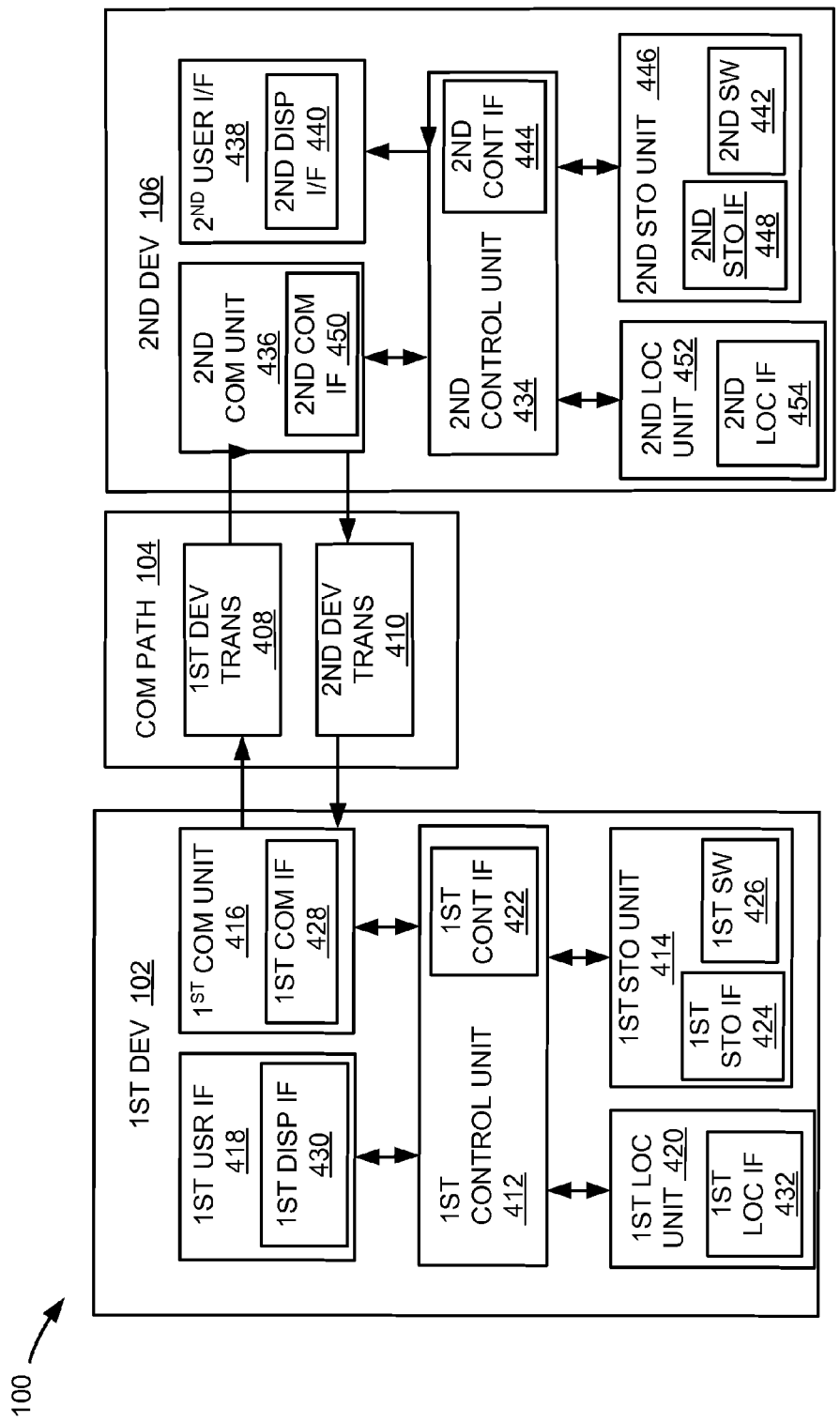
FIG. 4 is an exemplary block diagram of the navigation system.

Referring now to FIG. 4, therein is shown an exemplary block diagram of the navigation system 100. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a first location unit 420. The first device 102 of FIG. 4 can be similarly described by the first device 102 of FIG. 1.

The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first location unit 420 can generate location information, current heading, and current speed of the first device 102, as examples. The first location unit 420 can be implemented in many ways. For example, the first location unit 420 can function as at least a part of a global positioning system (GPS), an inertial navigation system, a cellular-tower location system, a pressure location system, or any combination thereof.

The first location unit 420 can include a first location interface 432. The first location interface 432 can be used for communication between the first location unit 420 and other functional units in the first device 102. The first location interface 432 can also be used for communication that is external to the first device 102.

The first location interface 432 can receive information from the other functional units or from external sources, or can transmit information to the other functional units or to external destinations. The external sources and the external destinations refer to sources and destinations external to the first device 102.

The first location interface 432 can include different implementations depending on which functional units or external units are being interfaced with the first location unit 420. The first location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the first location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. Examples of the first display interface 430 can include the display interface 202 of FIG. 2. The first display interface 430 can include a display, a projector, a video screen, a speaker, or any combination thereof. The screenshot shown on the display interface 202 described in FIG. 2 can represent an example of a screenshot for the navigation system 100.

The first control unit 412 can operate the first user interface 418 to display information generated by the navigation system 100. The first control unit 412 can also execute the first software 426 for the other functions of the navigation system 100, including receiving location information from the first location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, a second user interface 438, and a second location unit 452.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 106. The second controller interface 444 can also be used for communication that is external to the second device 106.

The second controller interface 444 can receive information from the other functional units or from external sources, or can transmit information to the other functional units or to external destinations. The external sources and the external destinations refer to sources and destinations external to the second device 106.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the first location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

The second location unit 452 can receive location information, current heading, and current speed of the first device 102, as examples. The second location unit 452 can be implemented in many ways. For example, the second location unit 452 can function as at least a part of a global positioning system (GPS), an inertial navigation system, a cellular-tower location system, a pressure location system, or any combination thereof.

The second location unit 452 can include a second location interface 454. The second location interface 454 can be used for communication between the second location unit 452 and other functional units in the first device 102. The second location interface 454 can also be used for communication that is external to the second device 106.

The second location interface 454 can receive information from the other functional units or from external sources, or can transmit information to the other functional units or to external destinations. The external sources and the external destinations refer to sources and destinations external to the second device 106.

The second location interface 454 can include different implementations depending on which functional units or external units are being interfaced with the second location unit 452. The second location interface 454 can be implemented with technologies and techniques similar to the implementation of the second controller interface 444.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the first location unit 420, although it is understood that the second device 106 can also operate the first location unit 420.

Figure 5:
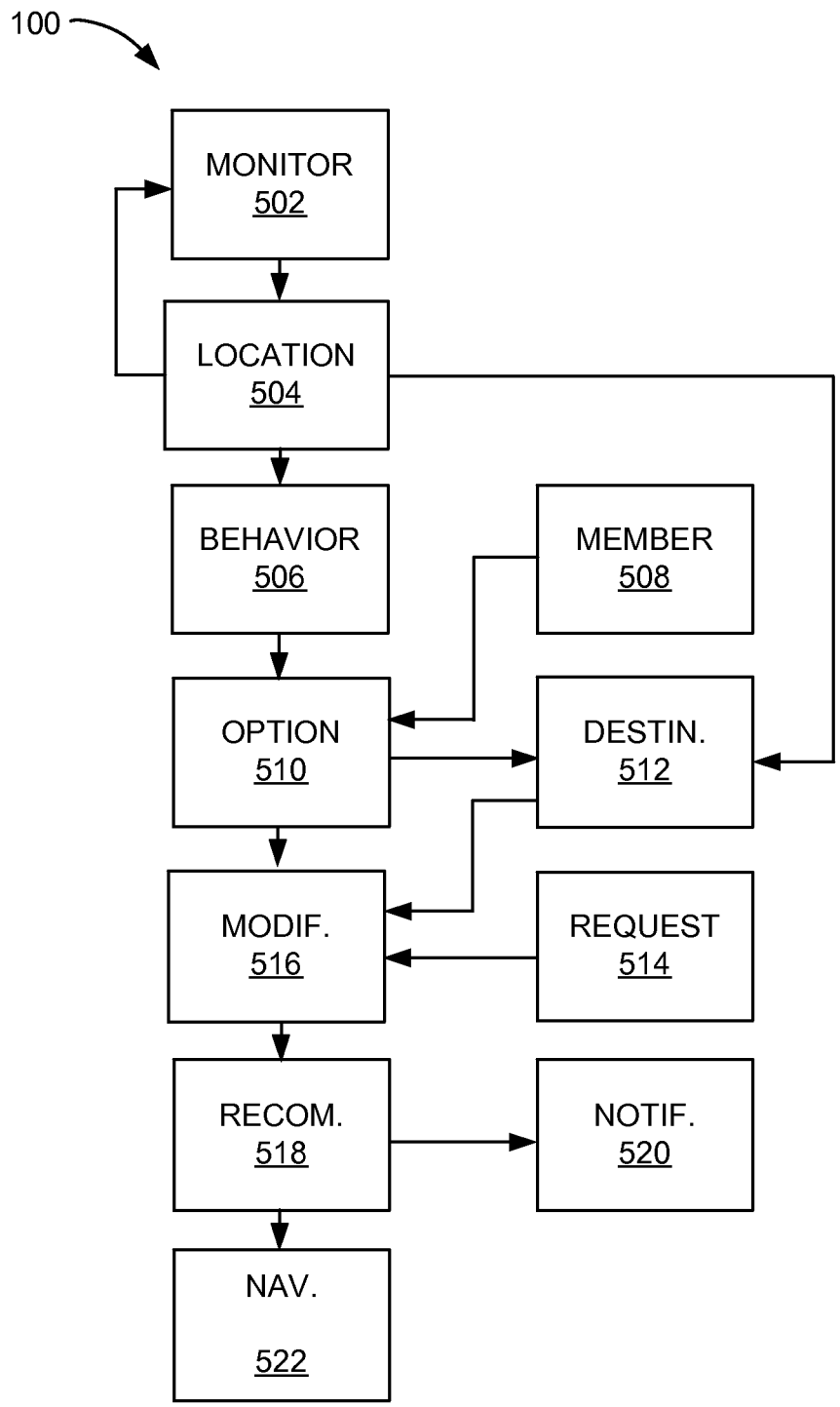
FIG. 5 is a control flow of the navigation system.

Referring now to FIG. 5, therein is shown a control flow of the navigation system 100. The navigation system 100 can include a monitor module 502, a location module 504, a behavior module 506, a member module 508, an option module 510, a destination module 512, a request module 514, a modification module 516, a recommendation module 518, a notification module 520, and a navigation module 522.

In the navigation system 100, as an example, each module is indicated by a number and successively higher module numbers follow one another. Control flow can pass from one module to the next higher numbered module unless explicitly otherwise indicated.

The monitor module 502 monitors and tracks the purchase history 206 of FIG. 2 of the participant. For example, the monitor module 502 monitors the purchase history 206 by identifying the item or service purchased, identifying the time of the purchase, identifying the price of the purchase, and identifying the store or location at which the purchase was made for storing in the purchase history 206.

The monitor module 502 can use various methods to identify the item or service purchased. For example, the monitor module 502 can monitor online takeout orders, restaurant reservations, payments made by mobile devices, and credit card purchases. A participant can use the first device 102 to purchase a good or service at a store. These methods provide the monitor module 502 with the time of the purchase history 206, the price of the purchase history 206, and the store or location of the purchase history 206.

The location module 504 identifies the current location 204 of FIG. 2 of the participant. The location module 504 can also identify the location of the purchase history 206. The location module 504 and the monitor module 502 can use reverse geocoding, which is finding an associated textual location description from geographic coordinates, to identify the current location 204 of the participant.

The location module 504 can be coupled to the monitor module 502 for sending the current location 204 to the monitor module 502. For example, the monitor module 502 can determine that the participant spent lunch at a sushi restaurant using reverse geocoding. The location module 504 can determine that the participant spent an hour at the sushi restaurant around noon and the monitor module 502 can determine that the participant had lunch at the sushi restaurant based on the associated context of the location and the time spent at the location.

The behavior module 506 extrapolates the selection behavior 304 of FIG. 3 from the purchase history 206. The behavior module 506 extrapolates the selection behavior 304 by tracking the purchase history 206 made by the participant and identifying patterns, associations, trends, preferences, and dislikes in the history. The purchase history 206 can be tracked for a week, for a month, or for a year to determine the selection behavior 304 of FIG. 3 for different time periods.

For example, the behavior module 506 can convert the purchase history 206 in a database or a data-mining index. The behavior module 506 can perform various methods of data analysis and machine learning on the database or data-mining index for identifying the selection behavior 304.

For example, the behavior module 506 can extrapolate association rules, which are rules that correlate with relationships from seemly-unrelated information from the data-mining indexes. Association rules can include "if then" statements between variables based on the occurrences of the relationships from the data-mining index for identifying preferences, dislikes, and patterns in the purchase history 206 and from geographic locations associated with the purchase history 206.

The behavior module 506 can identify association rules and regularities between purchased products, services, and geographic locations by tracking the occurrences of these items and how often different items in the database occur together. The behavior module 506 can assign a confidence percentage based on the occurrences and consistencies of the identified relationships. The association rules, regularities, and patterns having a high numerical value for the confidence percentage can be extrapolated as the selection behavior 304.

The selection behavior 304 can provide the navigation system 100 with information including consumer trends, consumer preferences, consumer dislikes, and consumer favorites from the extrapolated association rules from the purchase history 206. For example, the monitor module 502 can monitor purchases made for coffee between two coffee stores that are geographically close to each other. The behavior module 506 can associate the time and the location with a purchase of coffee to extrapolate the association rule that a participant prefers coffee at "Sundollar Coffee" and never at "Pete's Coffee" in the morning and on weekdays. The behavior module 506 can extrapolate the selection behavior 304 of a preference for "Sundollar Coffee" for the individual participant over "Pete's Coffee" regardless of geographic proximity of the coffee shops.

The behavior module 506 can identify outliers in the purchase history 206 to extrapolate dislikes, special conditions, or a preference for variety as the selection behavior 304. For example, a participant can be running a special errand for a friend that the participant would not normally purchase himself, such as a single male purchasing a feminine hygiene product for a friend. The behavior module 506 can identify the purchase as an anomaly and classify the purchase as a special condition if there are no more occurrences in the purchase history 206.

The behavior module 506 can also extrapolate the variety preference 226 FIG. 2 as the selection behavior 304 from the purchase history 206 of a participant. The behavior module 506 can identify a pattern of variation in a participant's purchasing behavior as the selection behavior 304 for a specific event, location, item, or category.

For example, the behavior module 506 can identify that a participant rarely goes to the same restaurant after a recent meal at the restaurant and extrapolate the variety preference 226 as the selection behavior 304 for restaurants. Further, for example, the behavior module 506 can identify that a participant prefers to order different items off a menu instead of having a preference for a particular dish and extrapolate the variety preference 226 as the selection behavior 304 for that restaurant menu.

The behavior module 506 can also identify the discount preference 228 of FIG. 2 as the selection behavior 304 of the participant using the same data mining and association rule methods described above. For example, the behavior module 506 can identify that a participant prefers sales and low prices when selecting purchases and extrapolate the discount preference 228 as the selection behavior 304 for that participant. The behavior module 506 can also identify and track specific brands and price-ranges that a participant frequently purchases.

The behavior module 506 also identifies the health condition 224 of FIG. 2 from the purchase behavior of the participant using the same data mining and association rule methods described above. For example, the monitor module 502 can identify that the participant recently purchased a wheel chair or crutches. If the navigation system 100 is used to suggest events and activities, the navigation system 100 can suggest activities that do not require walking as the recommendation 218 of FIG. 2.

The behavior module 506 can also identify other types of the health condition 224 by identifying types of medicine or medical services purchased by a participant. The behavior module 506 can also receive allergies and medical conditions as manual input by the participant for receiving the health condition 224. The behavior module 506 is coupled to the option module 510 for sending the selection behavior 304 to the option module 510.

The member module 508 sends and accepts invitations to events for generating the member designation 210 of FIG. 2. For example, a participant can use the member module 508 to create a lunch event by sending out invitations for the event. Invitations can appear on the display interface 202 of FIG. 2. Participants can accept the invitation and be included in the member designation 210.

The member module 508 can be coupled to the option module 510 for sending the member designation 210 to the option module 510. The option module 510 can request the selection behavior 304 from the behavior module 506 for each of the participants in the member designation 210 for identifying the group behavior 305 of FIG. 3.

The option module 510 extrapolates the group behavior 305 from the selection behavior 304 of each of the participants in the member designation 210. The option module 510 can identify common behaviors, preferences, and dislikes from the selection behavior 304 of participants in the member designation 210 including shared preferences, shared favorites, shared likes, shared dislikes, or a combination thereof.

The option module 510 can extrapolate the group behavior 305 from the selection behavior 304 of each of the participants in the member designation 210 using the same data mining, data analysis, and association rule identification methods described above. The option module 510 can combine the selection behavior 304 of each of the participants into a data base or information pool for extrapolating the group behavior 305. The group behavior 305 can be customized to only include the selection behavior 304 from participants in the member designation 210 and can exclude extraneous information such as preferences, favorites, behaviors, patterns, and dislikes of people outside the member designation 210.

The option module 510 also extrapolates the group specific behavior 306 of FIG. 3 from the purchase history 206 of each of the participants in the member designation 210. The option module 510 identifies patterns and association rules that only exist when common participants are in the member designation 210 and extrapolates the group specific behavior 306 from the behavior of the participants in the member designation 210.

The option module 510 can assign a confidence percentage to the group specific behavior 306 for validating the strength of the rule. The option module 510 can compare the confidence percentage of the group specific behavior 306 to other similar group specific behaviors from other member designations to determine the validity and strength of the group specific behavior 306.

The option module 510 can use the group behavior 305 and the group specific behavior 306 for generating a plurality of the preference option 220 of FIG. 2 for the member designation 210. The preference option 220 can be used as the recommendation 218 after additional preference filtering. The option module 510 can use recommendation systems methods such as collaborative filtering and the group behavior 305 and the group specific behavior 306 for extrapolating the preference option 220.

Collaborative filtering uses algorithms to make predictions about interests of participants based on similarities and relationships from ratings, preferences, and correlations of similar items and locations. The option module 510 can use the group behavior 305 and the group specific behavior 306 as sources for extrapolating the preference option 220. For example, if the group specific behavior 306 for the member designation 210 is a preference for vegetarian food, the plurality of the preference option 220 can be a number of popular vegetarian restaurants in the local area. Purchase items, goods, services, restaurants, and other types of the point of interest 205 of FIG. 2 that share similar characteristics or relationships can be generated as the preference option 220.

The option module 510 also assigns the weight 308 to the preference option 220 based on the group behavior 305 and the group specific behavior 306. The weight 308 assigned to each of the preference option 220 determines the hierarchy of how the plurality of the preference option 220 are presented to the member designation 210. The weight 308 can be assigned based the group behavior 305 for cuisine preferences, menu variety preferences, selection preferences, price preferences, genre preferences, composition of the member designation 210, or a combination thereof as examples. The weight 308 assigned by the option module 510 can later be modified based on other factors such as the preference request 222 of FIG. 2.

The option module 510 can be coupled to the modification module 516 for modification of the weight 308 of each of the preference option 220 based on inputs from the destination module 512 and the request module 514. The option module 510 can be coupled to the destination module 512 for sending the preference option 220 to the destination module 512 and for retrieving geographic locations associated with the preference option 220.

The destination module 512 identifies the event destination 208 of FIG. 2 such as the location of stores, restaurants, and establishments for the preference option 220. The destination module 512 also identifies the proximate destination 211 of FIG. 2 by comparing the distance between the current location 204 of each of the participants in the member designation 210 to the event destination 208. The destination module 512 can be coupled to the location module 504 for receiving the current location 204.

For example, the destination module 512 can identify the proximate destination 211 that is a centralized location for all of the participants in the member designation 210. If the participants plan to have an event at a franchised coffee shop, the destination module 512 can identify the coffee shop that is centrally located for each participant in the member designation 210. The coffee shop that is centrally located for all of the participants in the member designation 210 can be assigned a higher numeric value for the weight 308 over other types of the preference option 220 and will have a higher chance to be selected as the recommendation 218.

The destination module 512 can be coupled to the option module 510 for receiving the preference option 220. The destination module 512 can be coupled to the location module for receiving the current location 204 of a participant in the member designation 210. The destination module 512 can be coupled to the modification module 516 for sending the event destination 208 and the proximate destination 211 to the modification module 516.

The request module 514 receives the preference request 222 of FIG. 2 from a participant. The preference request 222 can be used to modify the weight 308 of each of the preference option 220 for the determination of the recommendation 218. For example, the request module 514 can receive a request for German food from a participant in the member designation 210. The preference request 222 can modify the weight 308 for German food to have a greater value and a higher chance to be selected as the recommendation 218.

The request module 514 can also receive the variety preference 226, the health condition 224, the discount preference 228, or a combination thereof as manual input from a participant. Participants can use the request module 514 to set preferences for specific events and to influence the selection of the recommendation 218. The request module 514 can be coupled to the modification module 516 for sending the preference request 222 to the modification module 516.

The modification module 516 modifies the weight 308 of the preference option 220 based on the preference request 222, the proximate destination 211, and the user's demographic 302 of FIG. 3. The modification module 516 can be used to adjust the weight 308 of each of the preference option 220 if the participants in the member designation 210 disagree to the results that were based on the group behavior 305 and the group specific behavior 306.

The preference request 222 can have a higher priority or a larger influence over the weight 308 for each of the preference option 220 to account for the current whims and desires of the participants. The modification module 516 can also assign a larger value for the weight 308 of the preference option 220 that includes the proximate destination 211.

The modification module 516 can use the user's demographic 302 to adjust the weight 308 of each of the preference option 220 based on genders and other demographical information. For example, if the member designation 210 is a group of all males, the modification module 516 can assign a higher numerical value to the weight 308 of movies that target male audiences.

Further, for example, the modification module 516 can use the event destination 208 and the proximate destination 211 to modify the weight 308 of each of the preference option 220. Restaurants that are geographically close to the current location 204 or centrally located for each participant in the member designation 210 can also be adjusted to have a higher value for the weight 308. The weight 308 assigned based on the proximity of the restaurant can be combined to the weight 308 assigned based on the group behavior 305. For example, restaurants and other locations that match the group behavior 305 and are geographically close to participants will be given a higher numerical value as the weight 308 compared to restaurants that only match the group behavior 305.

The recommendation module 518 generates the recommendation 218 by selecting the preference option 220 with the weight 308 with the largest value. The recommendation module 518 can also select the preference option 220 with a high value of the weight 308 and based on time of day, traffic, restaurant capacity, and other contextual factors surrounding the event. For example, the preference option 220 with the highest numerical value for the weight 308 can be for a restaurant in downtown. The recommendation module 518 can detect that the meeting time for the event will be during rush hour and select another highly weighted restaurant as the recommendation 218 because of the bad traffic context associated with the downtown restaurant.

Participants can also disregard the recommendation 218 selected by the recommendation module 518 and manually select a different option. Participants can still view each of the preference option 220 that were weighted by the option module 510 and the modification module 516 for selecting another of the preference option 220. The recommendation module 518 can be coupled to the notification module 520 for displaying the recommendation 218.

The notification module 520 generates the notification 212 of FIG. 2 of the recommendation 218 for displaying to participants. The notification module 520 can display the notification 212 having the recommendation 218 on the display interface 202 of FIG. 2. The notification module 520 can generate an audio message for playback or a message in text format as the notification 212.

The navigation module 522 generates the route 214 of FIG. 2 from the current location 204 of a participant to the event destination 208 of the recommendation 218. The navigation module 522 can also generate the route 214 from the current location 204 to another of the current location 204 for participants to carpool. The navigation module 522 can also generate the route 214 from the current location 204 to the event destination 208 for the other extrapolated selections of the preference option 220.

The physical transformation from monitoring the purchase history 206 and identifying the selection behavior 304 for generating the recommendation 218 results in movement in the physical world, such as people using the first device 102 based on the operation of the navigation system 100. As the movement in the physical world occurs, the movement itself creates additional information that is converted back to the first device 102 for generating the route 214, for monitoring subsequent purchases, and for updating the group behavior 305 for the continued operation of the navigation system 100 and to continue the movement in the physical world.

The modules of the navigation system 100 can be implemented on the first device 102 of FIG. 4, on the second device 106 of FIG. 4, or partitioned between the first device 102 and the second device 106. The first software 426 of FIG. 4 of the first device 102 of FIG. 4 can include the navigation system 100. For example, the first software 426 can include the monitor module 502, the location module 504, the behavior module 506, the member module 508, the option module 510, the destination module 512, the request module 514, the modification module 516, the recommendation module 518, the notification module 520, and the navigation module 522.

The first control unit 412 of FIG. 4 can execute the first software 426. The control unit can execute the monitor module 502 to monitor the purchase history 206. The first control unit 412 can execute the location module 504 to identify the current location 204. The first control unit 412 can execute the behavior module 506 to extrapolate the selection behavior 304.

The first control unit 412 can execute the option module 510 to extrapolate the preference option 220. The first control unit 412 can execute the member module 508 to receive the member designation 210. The first control unit 412 can execute the destination module 512 to identify the event destination 208 and the proximate destination 211. The first control unit 412 can execute the request module 514 to receive the preference request 222. The first control unit 412 can execute the modification module 516 to modify the weight 308 of the preference option 220.

The first control unit 412 can execute the recommendation module 518 to generate the recommendation 218. The first control unit 412 can execute the notification module 520 to generate the notification 212. The first control unit 412 can execute the navigation module 522 to generate the route 214.

The first communication unit 416 of FIG. 4 can be used by the monitor module 502, the behavior module 506, the member module, and the request module 514 to send and receive information. The location module 504, the destination module 512, and the navigation module 522 can use the first location unit 420 of FIG. 4 to locate participants, the current location 204, and the event destination 208. The first display interface 430 of FIG. 4 can be used by the notification module 520 and the navigation module 522 to display information.

In an example for the second device 106 of FIG. 4, the second software 442 of FIG. 4 can include the navigation system 100. For example, the second software 442 can include the monitor module 502, the location module 504, the behavior module 506, the member module 508, the option module 510, the destination module 512, the request module 514, the modification module 516, the recommendation module 518, the notification module 520, and the navigation module 522.

The second control unit 434 of FIG. 4 can execute the second software 442. The second control unit 434 can execute the monitor module 502 to monitor the purchase history 206. The second control unit 434 can execute the location module 504 to identify the current location 204. The second control unit 434 can execute the behavior module 506 to extrapolate the selection behavior 304.

The second control unit 434 can execute the option module 510 to extrapolate the preference option 220. The second control unit 434 can execute the member module 508 to receive the member designation 210. The second control unit 434 can execute the destination module 512 to identify the event destination 208 and the proximate destination 211. The second control unit 434 can execute the request module 514 to receive the preference request 222. The second control unit 434 can execute the modification module 516 to modify the weight 308 of the preference option 220.

The second control unit 434 can execute the recommendation module 518 to generate the recommendation 218. The second control unit 434 can execute the notification module 520 to generate the notification 212. The second control unit 434 can execute the navigation module 522 to generate the route 214.

The second communication unit 436 of FIG. 4 can be used by the monitor module 502, the behavior module 506, the member module, and the request module 514 to send and receive information. The location module 504, the destination module 512, and the navigation module 522 can use the second location unit 452 of FIG. 4 to locate participants, the current location 204, and the event destination 208. The second display interface 440 of FIG. 4 can be used by the notification module 520 and the navigation module 522 to display information.

In another example, the navigation system 100 can be partitioned between the first software 426 and the second software 442. For example, the first software 426 can include the request module 514. The second software 442 can include the monitor module 502, the location module 504, the behavior module 506, the option module 510, the member module 508, the destination module 512, the modification module 516, the recommendation module 518, the notification module 520, and the navigation module 522.

The second control unit 434 can execute modules partitioned on the second software 442 as previously described. The second communication unit 436, the second location unit 452, and the second display interface 440 can be used by the modules partitioned on the second device 106 as previously described.

The first control unit 412 can execute the modules partitioned on the first software 426 as previously described. The first communication unit 416, the first location unit 420, and the first display interface 430 can be used by the modules partitioned on the first device 102 as previously described.

It has been discovered that the present invention provides the recommendation 218 based on the group behavior 305 of participants in the member designation 210. The navigation system 100 can monitor the purchase history 206 and consumer actions to extrapolate the selection behavior 304 and the group behavior 305 from the purchase history 206 of a participant. The selection behavior 304 can include trends, preferences, dislikes, the health condition 224, and the user's demographic 302 associated with the participant for identifying the selection behavior 304. The group behavior 305 can be extrapolated from the selection behavior 304 of each of the participants in the member designation 210. The purchase history 206 can include menu items at restaurants, products, goods, services, movies, games, rentals, and other entertainment selections. The navigation system 100 can generate the recommendation 218 based on the preferences of the participant that is extrapolated from the group behavior 305.

Further, it has been discovered that the navigation system 100 can customize the recommendation 218 for a specific group of people in the member designation 210 and for a specific event. The navigation system 100 generates the recommendation 218 based on the group behavior 305 of the member designation 210 and does not include preferences from people outside the member designation 210. Extraneous and irrelevant influences are filtered out when generating the preference option 220 based on the participants of the member designation 210.

It has also been discovered that the present invention can extrapolate the group specific behavior 306 associated with specific groupings of participants. The navigation system 100 can identify behaviors, patterns, and preferences of individual participants that only occur in specific member designations. The navigation system 100 can compare the group specific behavior 306 of a participant to the participant's behavior in other groups to validate the confidence percentage of the group specific behavior 306. The group specific behavior 306 can be used to provide recommendations that are more accurate for specific groups of participants.

Further, it has been discovered that the navigation system 100 can modify the weight 308 of the preference option 220 and generate the recommendation 218 based on contextual considerations such as time of day, traffic, price, user demographics, sale events, store capacity, discounts, and seasonal information. The recommendation module 518 can use these contextual considerations to modify the weight 308 of each of the preference option 220 and for selecting the recommendation 218. Participants can view other suggestions of the preference option 220 if they disagree with the recommendation 218 made by the navigation system 100 for selecting an alternative option.

The navigation system 100 describes the module functions or order as an example. The modules can be partitioned differently. For example, the monitor module 502, the location module 504, the behavior module 506, the member module 508, the option module 510, the destination module 512, the request module 514, the modification module 516, the recommendation module 518, the notification module 520, and the navigation module 522 can be implemented as one module or with lesser number of modules. Each of the modules can operate individually and independently of the other modules.

Thus, it has been discovered that the navigation system 100 of the present invention furnishes important and heretofore unknown and unavailable solutions, capabilities, and functional aspects for the navigation system 100 for monitoring participants and providing the recommendation 218.

Figure 6:
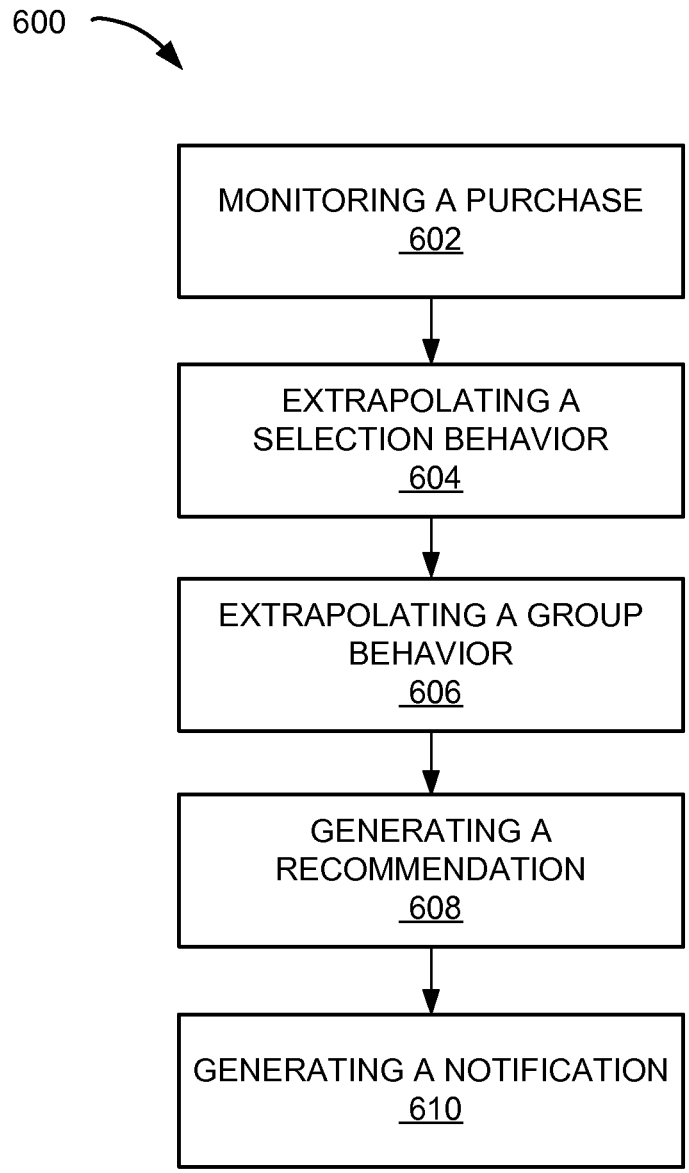
FIG. 6 is a flow chart of a method of operation of the navigation system in a further embodiment of the present invention.

Referring now to FIG. 6, therein is shown a flow chart of a method 600 of operation of the navigation system in a further embodiment of the present invention. The method 600 includes: monitoring a purchase history in a block 602; extrapolating a selection behavior associated with the purchase history in a block 604; extrapolating a group behavior for a member designation associated with the selection behavior in a block 606; generating a recommendation based on the group behavior in a block 608; and generating a notification with the recommendation for displaying on a device in a block 610.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   monitoring a purchase history;
   extrapolating a selection behavior from an association rule based on a confidence percentage of the association rule, wherein the association rule is determined by:
      identifying patterns between purchases in the purchase history and geographic locations of the purchases determined with a global positioning system of a device associated with the purchases; and
      tracking the frequency of occurrences between the purchases and the geographic locations;
   extrapolating a group behavior for a member designation associated with the selection behavior, the group behavior for identifying a pattern applicable across multiple participants corresponding to the member designation;
   generating a recommendation based on the group behavior; and
   generating a notification with the recommendation using a control unit for displaying on the device.

2. The method as claimed in claim 1 wherein generating the recommendation includes:
   identifying a current location of the device;
   identifying a proximate destination associated with the group behavior; and
further comprising:
   generating a route from the current location to the proximate destination.

3. The method as claimed in claim 1 further comprising:
   extrapolating a health condition from the purchase history; and
wherein:
   generating the recommendation based on the health condition.

4. The method as claimed in claim 1 further comprising:
   assigning a weight to each of a plurality of a preference option based on the group behavior of the member designation; and
wherein:
   generating the recommendation includes selecting from the plurality of the preference option based on the weight.

5. The method as claimed in claim 1 further comprising:
   extrapolating a group specific behavior based on the selection behavior of the member designation; and
wherein:
   generating the recommendation includes generating the recommendation based on the group specific behavior.

6. A method of operation of a navigation system comprising:
   monitoring a purchase history;
   extrapolating a selection behavior from an association rule based on a confidence percentage of the association rule, wherein the association rule is determined by:
      identifying patterns between purchases in the purchase history and geographic locations of the purchases determined with a global positioning system of a device associated with the purchases; and
      tracking the frequency of occurrences between the purchases and the geographic locations;
   extrapolating a group behavior for a member designation associated with the selection behavior, the group behavior for identifying a pattern applicable across multiple participants corresponding to the member designation;
   extrapolating a plurality of a preference option based on the group behavior;
   selecting a recommendation from the plurality of the preference option; and
   generating a notification with the recommendation using a control unit for displaying on the device.

7. The method as claimed in claim 6 further comprising:
   receiving a preference request;
   modifying a weight of the preference option based on the preference request; and
wherein:
   selecting the recommendation is based on the weight of the preference option.

8. The method as claimed in claim 6 wherein identifying the selection behavior includes identifying a variety preference.

9. The method as claimed in claim 6 wherein identifying the selection behavior includes identifying a user's demographic.

10. The method as claimed in claim 6 wherein identifying the selection behavior includes:
    identifying a discount preference associated with the group behavior; and
    modifying a weight of the preference option based on the discount preference.

11. A navigation system comprising:
    a control unit configured to:
       monitor a purchase history;
       extrapolate a selection behavior from an association rule based on a confidence percentage of the association rule, wherein the association rule is determined by:
          identifying patterns between purchases in the purchase history and geographic locations of the purchases determined with a global positioning system of a device associated with the purchases; and
          tracking the frequency of occurrences between the purchases and the geographic locations:
       extrapolate a group behavior for a member designation associated with the selection behavior, the group behavior for identifying a pattern applicable across multiple participants corresponding to the member designation;
       generate a recommendation based on the group behavior;
       generate a notification with the recommendation; and
    a communication unit, coupled to the control unit, configured to communicate the notification with the recommendation.

12. The system as claimed in claim 11 wherein the control unit is configured to:
    identify a current location of the device;
    identify a proximate destination associated with the group behavior; and
    generate a route from the current location to the proximate destination.

13. The system as claimed in claim 11 wherein the control unit is configured to:
    extrapolate a health condition from the purchase history;

and generate the recommendation based on the health condition.

14. The system as claimed in claim 11 wherein the control unit is configured to:

assign a weight to each of a plurality of a preference option based on the group behavior of the member designation; and generate the recommendation from the plurality of the preference option based on the weight.

15. The system as claimed in claim 11 wherein the control unit is configured to:

extrapolate a group specific behavior based on the selection behavior of the member designation; and generate the recommendation based on the group specific behavior.

16. The system as claimed in claim 11 wherein the control unit is configured to:

extrapolate a plurality of a preference option based on the group behavior; and select the recommendation from the plurality of the preference option.

17. The system as claimed in claim 16 wherein the control unit is configured to:

receive a preference request;

modify a weight of the preference option based on the preference request; and select the recommendation based on the weight of the preference option.

18. The system as claimed in claim 16 wherein the control unit is configured to identify a variety preference.

19. The system as claimed in claim 16 wherein the control unit is configured to identify a user's demographic.

20. The system as claimed in claim 16 wherein the control unit is configured to:

identify a discount preference associated with the group behavior; and modify a weight of the preference option based on the discount preference.

\* \* \* \* \*